Aug. 14, 1923.

F. M. MORRIS 1,465,168

HITCH

Filed Dec. 3, 1921

F. M. Morris
INVENTOR

BY Victor J. Evans
ATTORNEY

WITNESS:

Aug. 14, 1923.

F. M. MORRIS

HITCH

Filed Dec. 3, 1921

F. M. Morris
INVENTOR

Patented Aug. 14, 1923.

1,465,168

UNITED STATES PATENT OFFICE.

FRED MONROE MORRIS, OF PASCAGOULA, MISSISSIPPI.

HITCH.

Application filed December 3, 1921. Serial No. 519,696.

*To all whom it may concern:*

Be it known that I, FRED M. MORRIS, a citizen of the United States, residing at Pascagoula, in the county of Jackson and State of Mississippi, have invented new and useful Improvements in Hitches, of which the following is a specification.

This invention relates to an attachment mainly designed for connecting a tractor with an agricultural implement or the like, the general object of the invention being to provide a hitch which can be manipulated by the operator of the tractor without the help of a second person.

Another object of the invention is to so arrange the parts that the implements can be connected together without danger to the operator.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
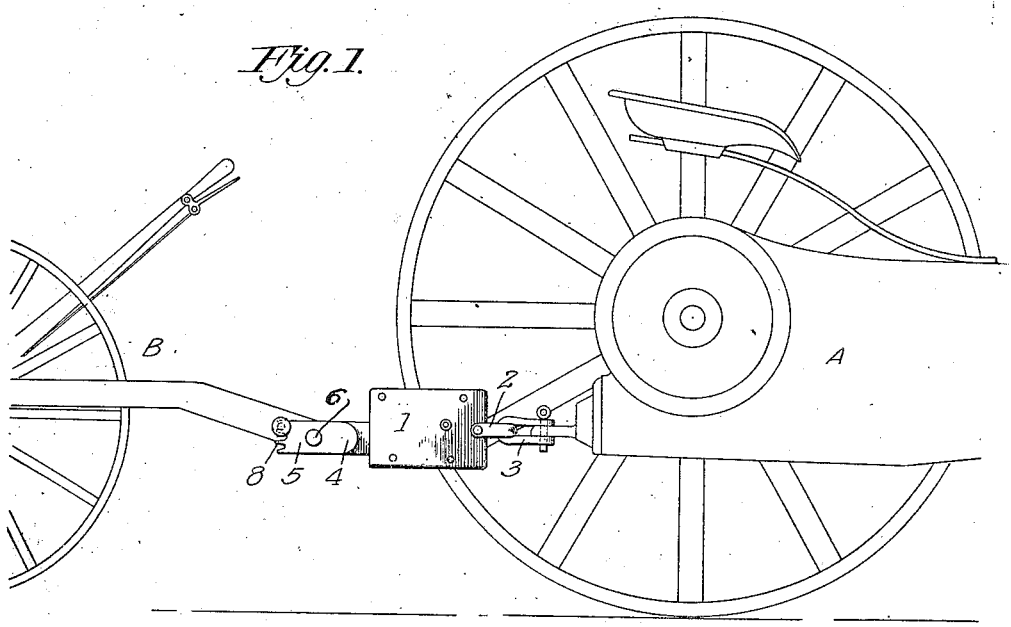
Figure 1 is a partial side elevation showing my invention in use.
Figure 2:
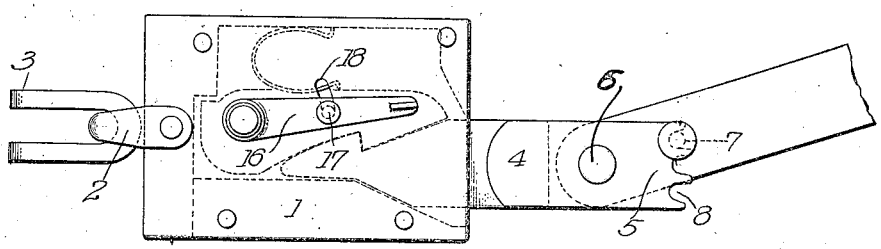
Figure 2 is a side view showing the inclosed mechanism in dotted lines.
Figure 3:
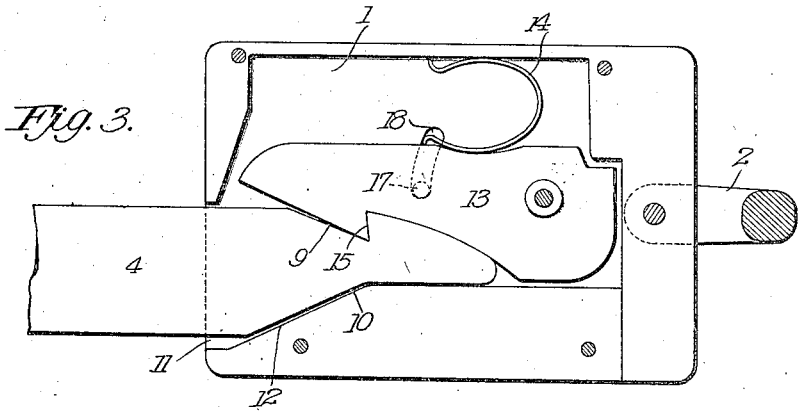
Figure 3 is an enlarged side view with a portion of the casing removed.
Figure 4:
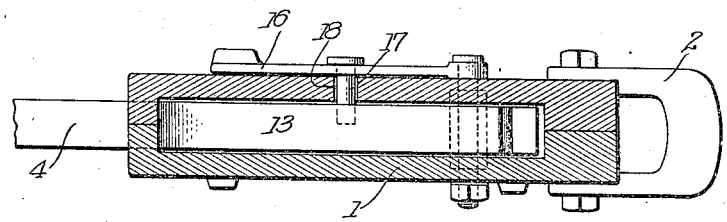
Figure 4 is a horizontal sectional view taken through the casing, partly in plan.
Figure 5:
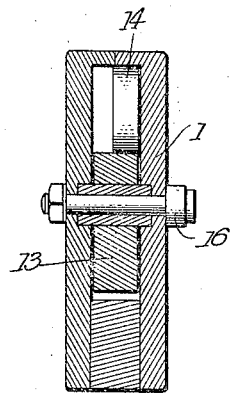
Figure 5 is a sectional view taken vertically through the casing.

In these views A indicates a portion of the tractor and B a portion of the implement which is to be connected with the tractor. The hitch for connecting the two members together comprises a casing 1 which is connected with the tractor by means of the shackles 2 and 3, and the arrow-shaped member 4 which is connected with the implement by the clevis 5, this clevis being adjustably connected with said member by means of the pivot pin 6 and the bolt 7 which engages any one of a plurality of notches 8 in the said member. The outer end of said member 4 is of the shape shown so as to provide a dog receiving notch 9 at one edge and an opposing guiding edge 10. The casing has a receiving opening 11 therein for the member 4, one wall of the opening being beveled as at 12, for cooperating with the guiding edge of said member. A dog 13 is pivotally mounted in the casing and a spring 14 presses the dog towards the beveled part 12. This dog is provided with a shoulder 15 for engaging the notch 9 of member 4 so as to lock said member in the casing. A lever 16 is pivotally mounted on one side of the casing and a pin 17 connects said lever with the dog, the pin passing through a slot 18 so that the dog can be moved away from the member 4 by manipulating said lever.

From the above it will be seen that it is simply necessary to direct the members 4 into the casing and that said member will be automatically locked therein as soon as it has moved far enough to permit the shoulder on the dog to engage the notch 9. In order to uncouple the parts the lever 16 must be swung over to move the dog out of engagement with the member 4. The shackle connection between the casing and tractor permits the casing to have the required amount of play and the member 4 is adjustably connected with the implement or wagon by the clevis.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tractor hitch of the character described comprising a casing having a slot arranged therein and being provided with a receiving opening entering one end thereof, said opening having a beveled wall, a dog pivotally secured within the casing, a spring adapted to press the dog toward the beveled wall, an arrow shaped member adapted to cooperate with the beveled wall of the opening and said wall being so designed to guide said arrow-shaped member inwardly to engage the pivoted dog, a lever pivotally secured to one side of the casing and a pin passing through the slot and connecting the pivoted dog with the pivoted lever as and for the purpose specified.

In testimony whereof I affix my signature.

FRED MONROE MORRIS.